United States Patent [19]

Kuse et al.

[11] Patent Number: 5,056,205
[45] Date of Patent: Oct. 15, 1991

[54] METHOD OF AND APPARATUS FOR MANUFACTURING SLIDE FASTENERS

[75] Inventors: Kazuki Kuse; Yozo Okada, both of Toyama; Tatsuo Ito, Kurobe, all of Japan

[73] Assignee: Yoshida Kogyo K. K., Tokyo, Japan

[21] Appl. No.: 581,551

[22] Filed: Sep. 12, 1990

[30] Foreign Application Priority Data

Sep. 12, 1989 [JP] Japan .................................. 1-235954
May 29, 1990 [JP] Japan .................................. 2-138932

[51] Int. Cl.⁵ .............................................. B29B 5/00
[52] U.S. Cl. ........................................ 29/408; 29/766
[58] Field of Search ................. 29/408, 409, 410, 766, 29/33.2

[56] References Cited

U.S. PATENT DOCUMENTS

| | | |
|---|---|---|
| 3,530,563 | 9/1970 | Maeda . |
| 3,626,579 | 12/1971 | Maeda .............................. 29/408 |
| 3,644,981 | 2/1972 | Gustavsson ....................... 29/768 |
| 3,714,698 | 2/1973 | Fukuroi ............................ 29/408 |
| 4,265,014 | 5/1981 | Yoshieda et al. ................. 29/766 |
| 4,489,873 | 12/1984 | Yoshida et al. ................... 226/162 |
| 4,821,396 | 4/1989 | Yoshieda et al. ................. 29/410 |
| 4,835,845 | 6/1989 | Sassa ................................. 29/767 |
| 4,845,829 | 7/1989 | Sassa ................................. 29/409 |
| 4,932,113 | 6/1990 | Frohlich et al. .................. 29/409 |

FOREIGN PATENT DOCUMENTS 39-19216 9/1964 Japan .
42-16835 9/1967 Japan .
59-22900 7/1984 Japan .

Primary Examiner—P. W. Echols
Attorney, Agent, or Firm—Hill, Van Santen, Steadman & Simpson

[57] ABSTRACT

A method of and an apparatus for manufacturing slide fasteners from an elongate stringer chain are disclosed, the method comprising metering the starting stringer chain to provide different prospective product lengths of slide fasteners and maintaining a provisional inventory of the thus metered stringer chain in advance of gapping the stringer chain.

10 Claims, 11 Drawing Sheets

METHOD OF AND APPARATUS FOR MANUFACTURING SLIDE FASTENERS

BACKGROUND OF THE INVENTION

1. Field of the Invention

This invention relates generally to the manufacture of slide fastener products from an elongate continuous stringer chain and more particularly to a method of and an apparatus for manufacturing slide fasteners in a continuous integrated cycle of operation in which their product length and/or type are variable at will.

2. Prior Art

There are known methods of making slide fasteners from a continuous length chain of stringers to which various component parts such as sliders, end stops, separators and the like are applied. Typical examples of such methods are disclosed for example in Japanese Patent Publication No. 39-19216 and Japanese Laid-Open Disclosure No. 64-37903. When assembling slide fasteners with component parts varying in type, material, color and other characteristics, it was necessary to discontinue the manufacturing operation each time for replacement of the stringer chains, or to use separate apparatus each time assigned to the assembling of specific like component parts, or alternatively to modify the manufacturing systems to enable the feeding and attachment of fastener component parts of different characteristics. These procedures are indeed tedious, time-consuming and economically infeasible particularly where a wide variety of slide fasteners are to be manufactured in relatively small lots to suit the customer's need.

SUMMARY OF THE INVENTION

With the foregoing difficulties in view, the present invention seeks to provide a method of manufacturing slide fasteners from a continuous one and the same stringer chain or a stringer chain consisting of different groups of interconnected stringers in which component parts of different types, forms, materials or colors are selectively fed and attached in a continuous integrated cycle of operation and in which slide fasteners are available with optional product lengths.

The invention further seeks to provide an apparatus for reducing the above method to practice.

In a copending application with a claim to Convention Priority arising from Japanese Patent Application No. 1-235954, there is disclosed a method of manufacturing slide fasteners which comprises the steps of (a) gapping an elongate continuous stringer chain to provide element-free space portions at predetermined intervals therealong, (b) selecting a predetermined bottom end stop member from among a plurality of bottom end stop members differing in type, form, material or color and attaching the same to the stringer chain, (c) selecting a predetermined slider from among a plurality of sliders differing in type, form, material or color and attaching the same to the stringer chain, (d) attaching a top end stop member to the stringer chain and (e) cutting the stringer chain centrally across the element-free space portions into individual slide fastener products.

It has now been found that slide fasteners of optional product lengths and optional colors, materials and forms can be readily manufactured from a continuous single stringer chain or a stringer chain consisting of a plurality of different types of interconnected groups of stringers substantially in a continuous integrated cycle of operation (without need for shut-down each time for stringer chain replacement) by metering the stringer chain to provide different prospective slide fastener product lengths and maintaining a provisional inventory of the thus metered lengths of the stringer chain in advance of the gapping operation (a) in the aforesaid copending application and prior to subsequent parts assembling.

The above and other objects and features of the invention will appear clear from the following detailed description taken in conjunction with the accompanying drawings.

According to the invention, there is provided a method of manufacturing slide fasteners in combination with the steps of gapping an elongate continuous stringer chain to provide element-free space portions at predetermined intervals therealong, applying various fastener component parts to the stringer chain and cutting the stringer chain into individual slide fastener products, the method comprises metering the elongate continuous stringer chain to provide different prospective slide fastener product lengths and maintaining a provisional inventory of the thus metered lengths of the stringer chain in advance of the gapping.

DETAILED DESCRIPTION OF THE INVENTION

Figure 1:
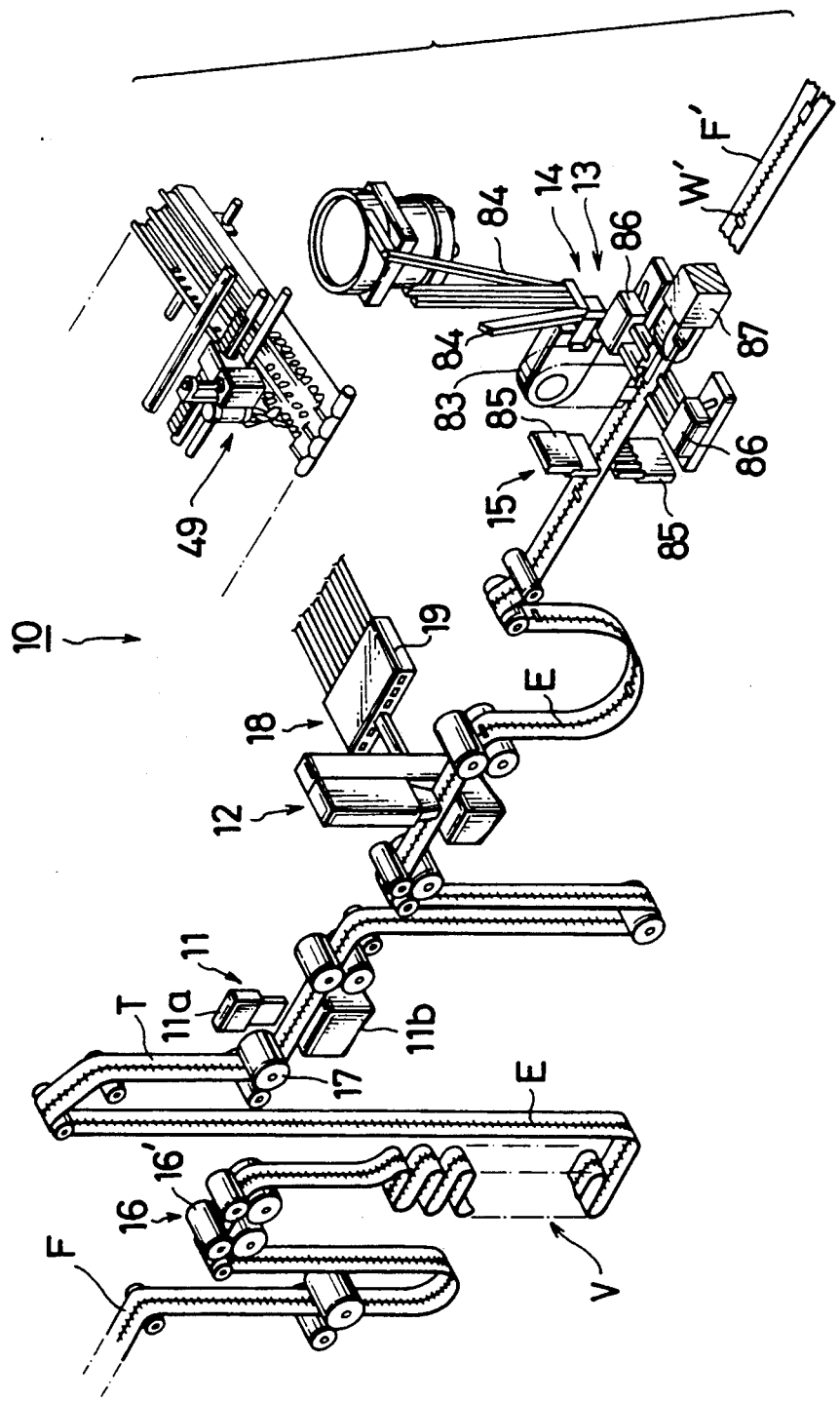
FIG. 1 is a schematic perspective view diagrammatically illustrating the overall process steps involved in the manufacture of slide fasteners according to the invention.
Figure 2:
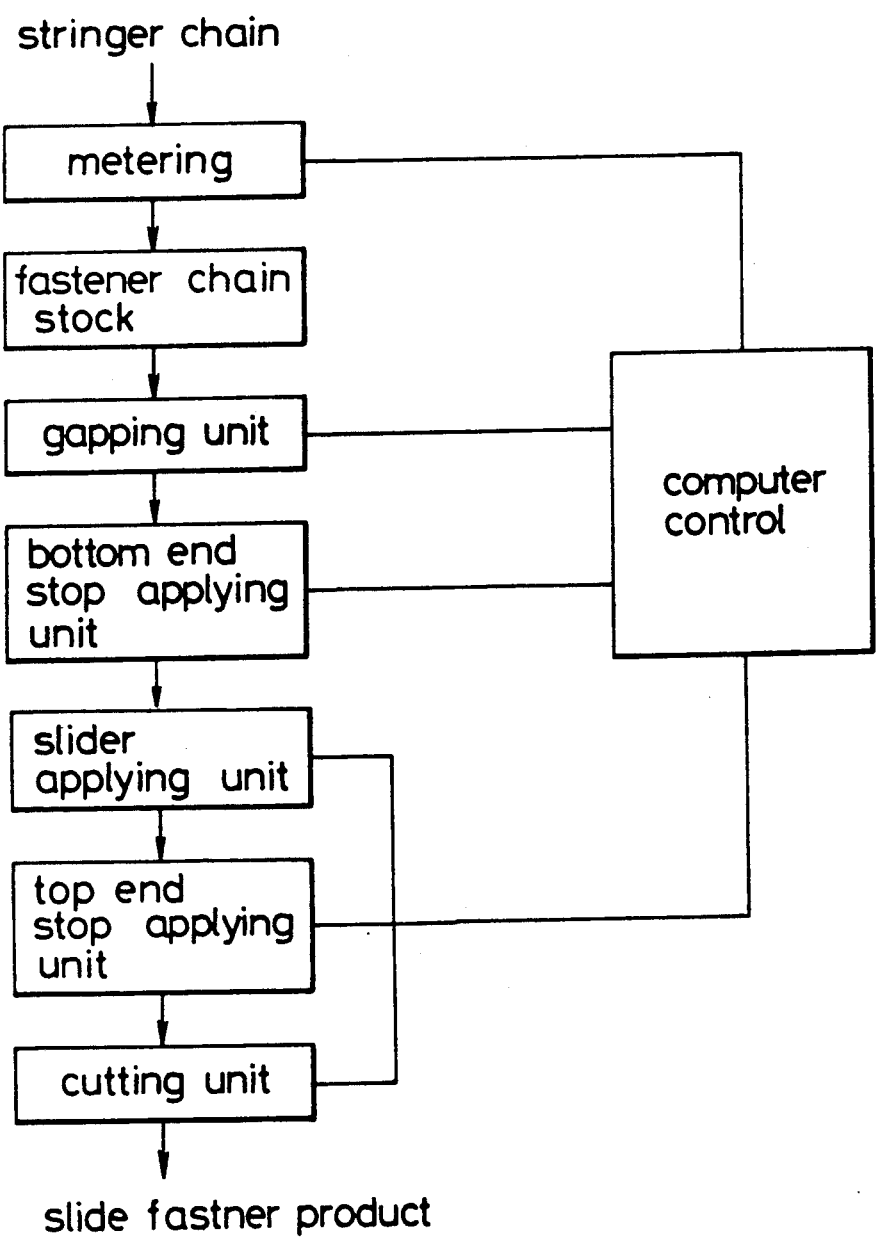
FIG. 2 is a block diagram showing the various stages of parts assembling for a non-separable slide fastener.

Referring now to the drawings and FIGS. 1 and 2 in particular there is shown an apparatus carrying the method of the invention into practice for manufacturing a non-separable type of slide fastener, which apparatus generally designated 10 essentially comprises a gapping unit 11, a bottom end stop applying unit 12, a slider applying unit 13, a top end stop applying unit 14, and a cutting unit 15. These units are represented by respective blocks in FIG. 2.

Figure 4:
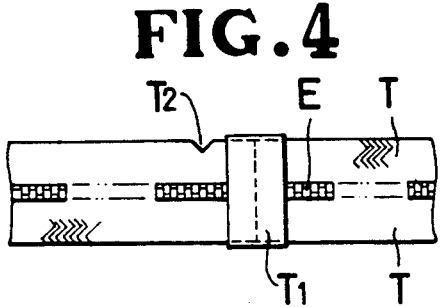
FIG. 4 is a segmentary plan view of a stringer chain.

A starting stringer chain F comprises a pair of oppositely disposed stringer tapes T, T and a row of fastener coupling elements E attached to an inner longitudinal edge of each of the tapes T, T. The coupling elements E may be formed from a metallic or plastics material into a continuous helical coil or meandering structure or into a discrete formation. For purposes of illustration, the stringer chain F is in the form of an elongate continuous or substantially endless chain having tapes T, T and elements E of different colors, or in the form of such a chain which comprises a plurality of interconnected individual stringers of a predetermined length having tapes T, T and elements E of different forms and colors. Each of such interconnected stringers is joined with adjacent stringers by a connecting strip $T_1$ and marked or otherwised notched at an outer longitudinal edge of the tape T, as at $T_2$ as shown in FIG. 4. The connecting strips $T_1$ may be utilized as a means of identifying the type or form of fastener component parts to be applied onto a stringer chain F. However, to ensure fool-proof identification of the stringer chain F, the notch or other suitable marking means $T_2$ may be effectively used for detection by, for example, a photoelectric sensor not shown.

The starting stringer chain F supplied from a source not shown is metered by a metering roll assembly 16 which meters the length of the chain F by counting the number of revolutions for instance of a roll 16', thereby providing different groups of stringers each having a predetermined prospective product length. The feeding of the stringer chain F is arranged to stop upon completion of a predetermined number of revolutions of the roll 16'. This metering is effected with accuracy by maintaining nipping engagement of the roll 16' peripherally with the rows of coupling elements E on the stringer chain F. A reservoir V is provided for temporarily storing a mix of stringer chains F of different lengths and different product characteristics which have been metered and fed from the metering assembly 16 and which are later finished with compatible or harmonious component parts.

Figure 3A:
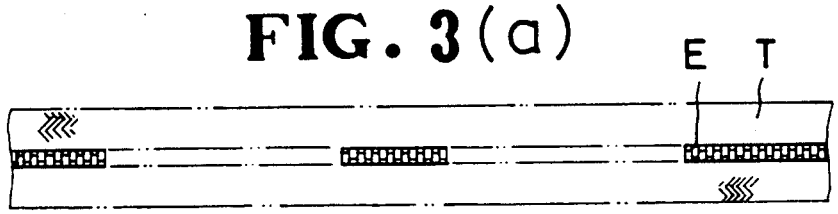
FIGS. 3(a)-3(e) inclusive are plan views of a fastener stringer chain shown progressively assembled and finished.
Figure 3B:
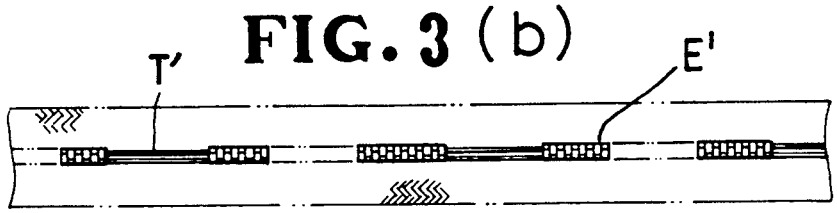
Figure 3C:
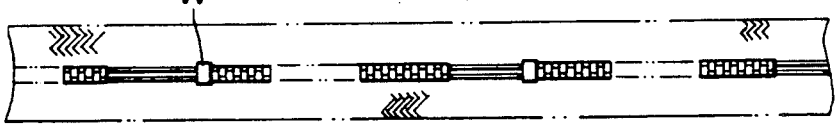

The chain F is advanced by feed rolls 17 into the gapping unit 11, which essentially comprises a punch 11a and a die anvil 11b disposed in vertical confronting relation to each other, and gapped at a predetermined position to remove a length of coupling elements E thereby providing an element-devoid space portion T' at predetermined intervals as shown in FIG. 3b.

The stringer chain F is then introduced to the bottom end stop applying unit 12 whereby a bottom end stop (W') is attached to the chain F at an endmost coupling element E' lying in the space portion T' which has been provided at the gapping unit 11.

Figure 5:
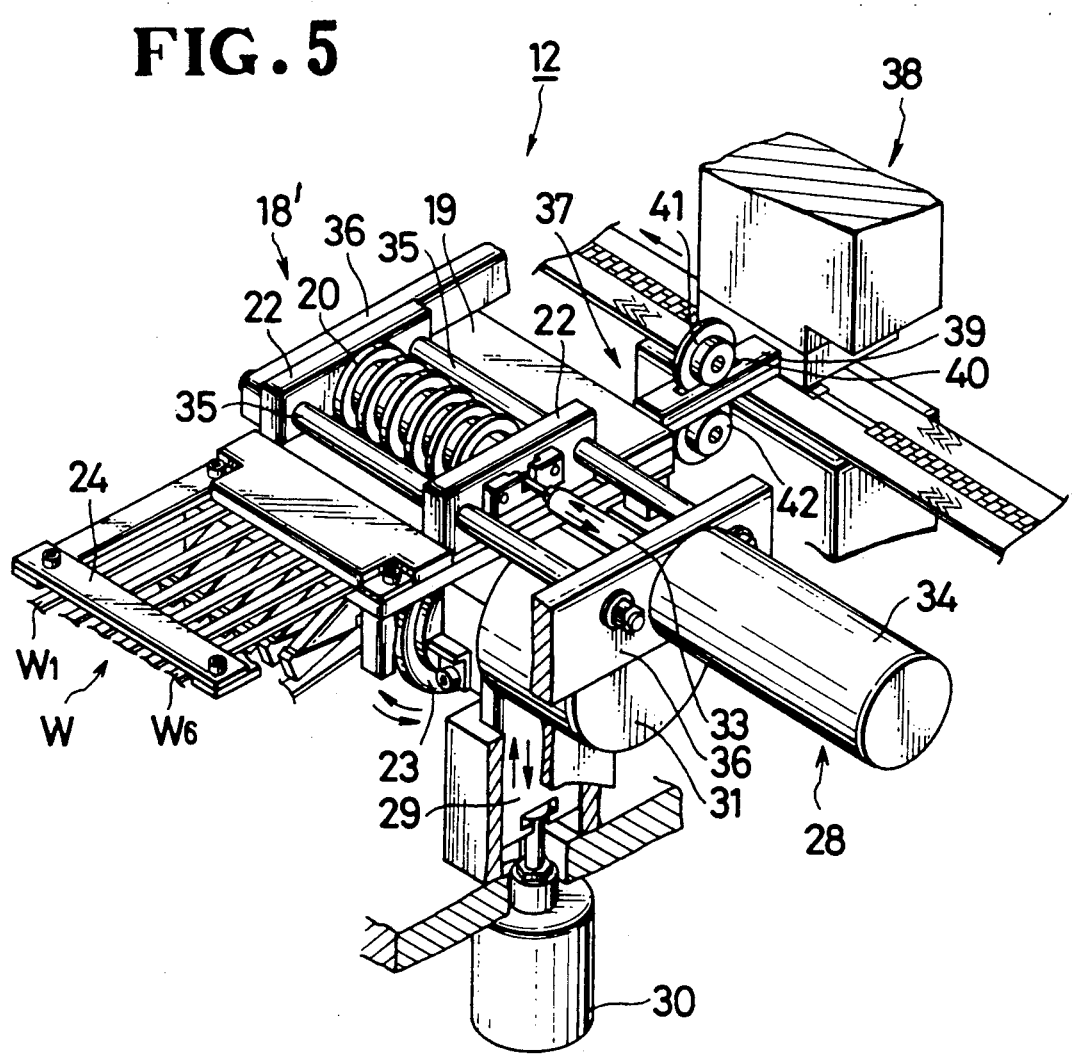
FIG. 5 is a perspective view of an apparatus for feeding and applying bottom end stops to the stringer chain.

The bottom end stop applying unit 12 is better shown in FIG. 5. The unit 12 comprises a first feed means 18' including a feed table 19 movable back and forth in a direction parallel to the path of travel of the stringer chain F. A plurality of pressure rollers 20 are coaxially mounted on a shaft 21 journalled in opposed bearing plates 22 integral with the feed table 19 and selectively engageable with a feed roller 23 to feed a selected one of a plurality of bottom end stop forming elongate flat wire strips $W_1$-$W_6$ in a manner hereinafter to be described. The feed table 19 includes a transverse guide member 24 located at a rear end remote from the path of the stringer chain F and adapted to hold the wire strips $W_1$-$W_6$ in spaced parallel alignment as shown in FIG. 5.

The wire strips $W_1$-$W_6$ are held in controlled relation to the peripheries of the pressure rollers 20 in the feed table 19 and are selectively fed one at a time when the feed roller 23 is brought into nipping engagement with a selected one of the pressure rollers 20.

A transfer means generally designated at 28 is provided for transferring the wire strips $W_1$-$W_6$ selectively one at a time from the first feed means 18 onto a second feed means later described. The transfer means 28 comprises a support block 29 which is vertically movable by means of a pneumatic cylinder 30 and on which the feed roller 23 is rotatably supported, and a reversible motor 31 adapted to drive the feed roller 23 both in forward and reverse directions. The support block 29 on actuation of the cylinder 30 brings the feed roller 23 into and out of nipping engagement with a selected one of the pressure rollers 20.

The pressure rollers 20 are selectively engageable with the feed roller 23 by the movement of the feed table 19 which takes place in a direction transversely across the array of wire strips $W_1$-$W_6$ or parallel to the path of the stringer chain F.

The above movement of the table 19 is effected by a reciprocating piston 33 actuated by a pneumatic cylinder 34 and a pair of stationary support rods 35 extending horizontally from oppositely disposed frame members 36. The bearing plates 22, one of which is connected to the piston 33, are slidably mounted on the support rods 35 so that the feed table 19 integral with the bearing plates 22 can be moved back and forth and relative to and between the frame members 36. The stroke of the piston 33 is controlled by a computer program system not shown so that the feed table 19 move intermittently a preset distance to bring a particular selected one of the pressure rollers 20 into registry peripherally with the feed roller 23.

Figure 6:
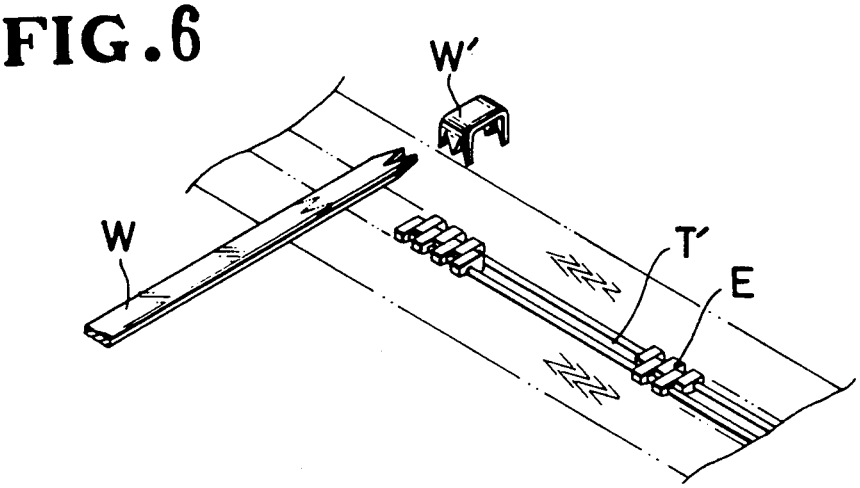
FIG. 6 is a schematic perspective view showing a bottom end stop being applied to the stringer chain.

A second feed means 37 is connected directly to a bottom end stop attaching means 38 of a known construction which is designed to cut the wire strip W into a staple-like end stop W' and attach the same to the endmost coupling element E' at a leading end of the space portion T' of the stringer chain F as illustrated in FIG. 6. The second feed means 37 comprises a transfer table 39 having a longitudinal slit 40 and a pressure roller 41 disposed above the table 39 and a feed roller 42 disposed under the table 39 in confronting relation to the pressure roller 41. The pressure roller 41 is vertically movable toward and away from the feed roller 42 as shown in FIG. 5 and engageable with the latter across the slit 40 which is disposed in alignment with the periphery of the feed roller 23 in the transfer means 28.

Figure 7:
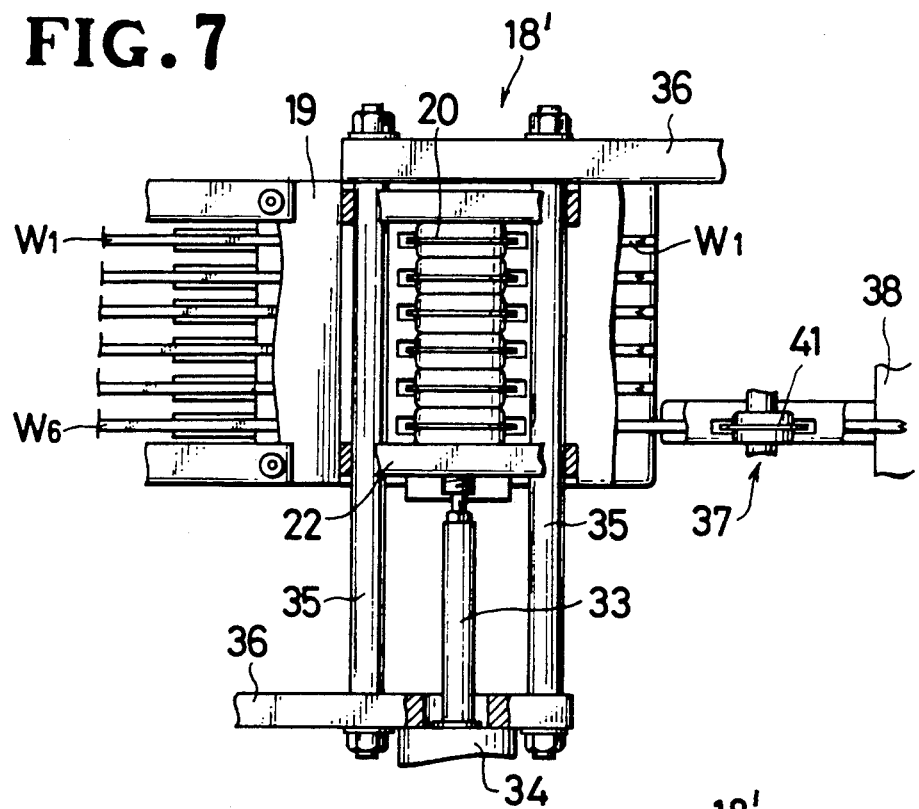
FIG. 7 is a plan view of the apparatus of FIG. 5 shown in one phase of operation.
Figure 8:
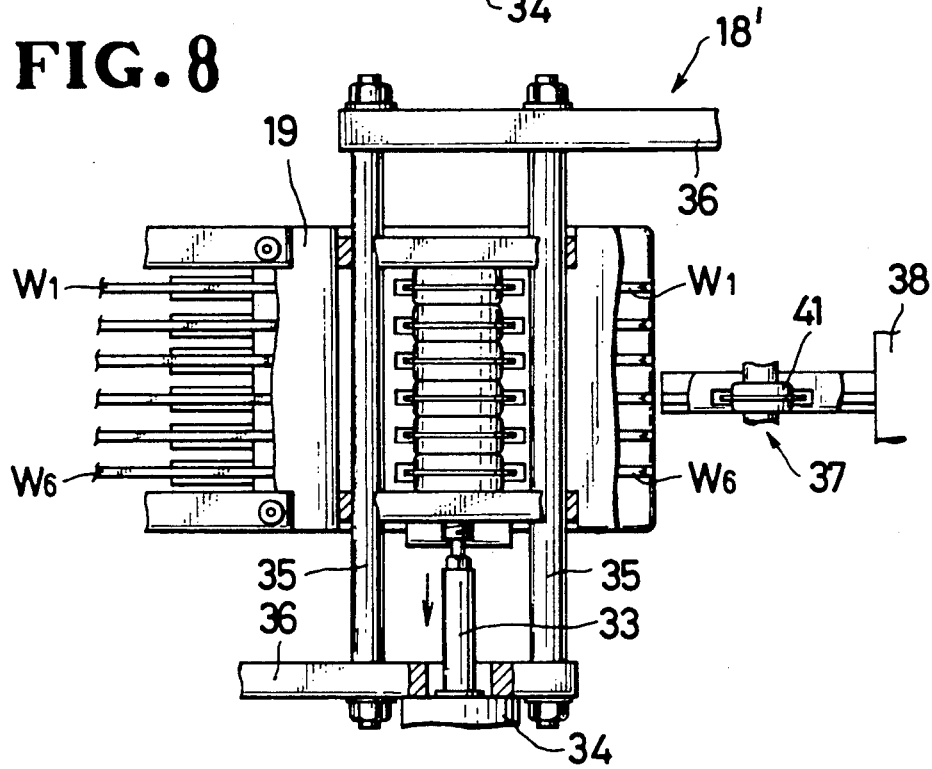
FIG. 8 is a view similar to FIG. 7 but showing the apparatus of FIG. 5 in another phase of operation.

The feed table 19 is moved in a direction parallel to the path of the chain F by the cylinder piston 33 for instance from the position of FIG. 7 to the position of FIG. 8 at which the wire strip $W_4$ alone amongst the other strips W is brought into alignment with the slit 40 of the transfer table 39 in the second feed means 37. The feed roller 23 then rotates and advances the selected wire strip W4 toward the second feed means 37, the arrival of the strip W4 at the slit 40 in the transfer table 39 being detected whereupon the feed roller 23 is stopped. The pressure roller 41 in the second feed means 37 then descends and comes into nipping engagement with the feed roller 42 in the zone of the slit 40 to feed the wire strip W4 into the end stop attaching machine 38 wherein the strip W4 is cut into a staple-like end stop and attached onto the stringer chain F.

The above-described bottom end stop applying unit 12 can be utilized equally to feed and attach a top end stop Y to the stringer chain F at an inner edge thereof.

The stringer chain F having a selected one of the bottom end stops W thus attached thereon is now advanced into the slider applying unit 13 wherein a slider S of a particular characteristic, for example, a specific color compatible or harmonious with the stringer chain F is selectively applied.

Figure 9:
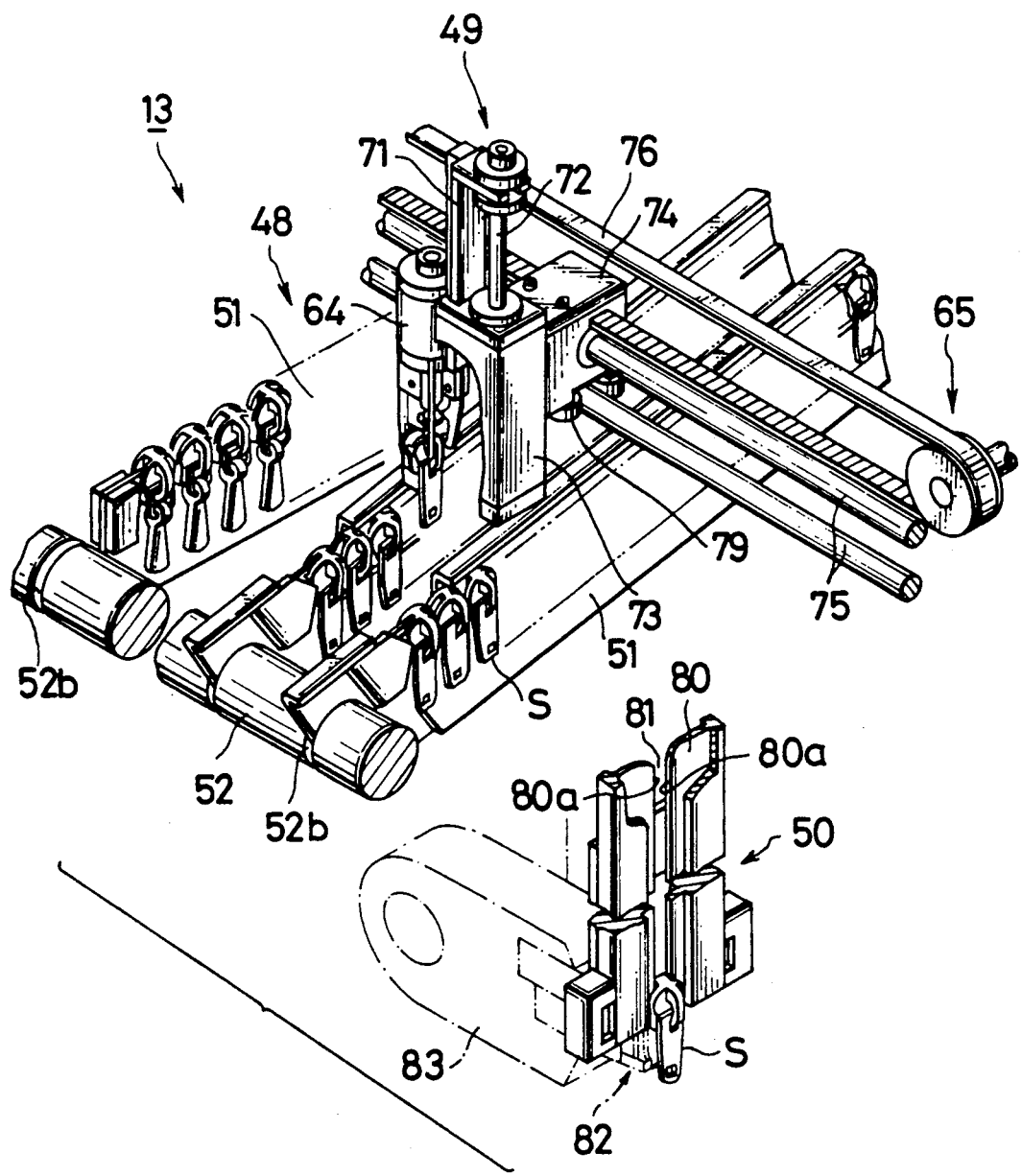
FIG. 9 is a perspective view of an apparatus for feeding and applying sliders to the fastener stringer chain.

The slider applying unit 13 shown in FIG. 9 essentially comprises a slider inventory means 48, a slider transfer means 49 and a slider guide means 50. The slider inventory means 48 comprises a plurality of slider stockers 51a-51p each releasably holding sliders S thereon, arranged in spaced parallel relation to one another and supported at one end on a first stocker holder 52 and at the opposite end on a second stocker holder not shown, both holders being in the form of an elongated rod. The second stocker holder is located at a level higher than the first stocker holder 52 such that the slider stockers 51a-51p are tilted downwardly to facilitate sliding downward movement of individual sliders S by gravity in and along the stockers 51a-51p. The first and second stocker holders each extend horizontally between and secured to vertical support columns not shown and each have peripheral grooves 52b and 53b provided at intervals corresponding to the slider stockers 51a-51p.

The slider transfer means 49 has a slider transfer holder 64.

The slider transfer holder 64 is connected via connecting plate 71 to a piston rod 72 of a second pneumatic or hydraulic cylinder 73 and is thus vertically movable with the piston rod 72 toward and away from the array of slider stockers 51a-51p. The cylinder 73 is connected to a movable support block 74 which is movably supported on a pair of horizontal guide rods 75 extending transversely across the array of slider stockers 51a-51p between the oppositely disposed vertical support columns not shown.

The slider transfer holder 64 is reciprocably movable transversely across the array of slider stockers 51a-51p by means of its drive 65 which comprises an endless timing drive belt 76 extending parallel with the guide rods 75 and driven by an encoder-controlled reversible motor not shown. The motor is controlled so that the slider transfer holder 64 reciprocates between the position of a selected one of the slider stockers 51a-51p and the position of the slider guide means 50. To facilitate smooth sliding movement of the slider transfer holder 64, there are provided a pair of guide rollers 79 rotatably secured to the movable support block 74 and disposed in rotating relation to one of the guide rods 75.

The slider guide means 50 comprises a vertically disposed guide plate 80 having an elongate guide slit 81 defined by confronting inner longitudinal edges 80a. The upper end of the guide plate 80 is located in close proximity to an endmost stocker holder 51 and is preferably flared to provide increased opening for receiving the slider S from the slider transfer holder 64. Operatively connected to the lower end of the guide plate 80 is a slider holder 82 of conventional construction having a nest (not shown) communicating with the guide slit 81 and connected to a swing arm 83 pivotally movable toward and away from the path of the stringer chain F. The slider S, when transferred from the transfer holder 64, slides down the guide plate 80 with its channel received at the inner edges 80a and with its neck portion received in the guide slit 81 as shown in FIG. 9. The sliders S are then further transferred one at a time onto the slider holder 82 for threading through the stringer chain F in a manner well known and as shown in FIG. 3(e).

The operation of the slider applying unit 13 is automatically carried out under computer program control to selectively feed the sliders S one at a time from among a plurality of slider stockers 51a-51p.

Figure 3D:
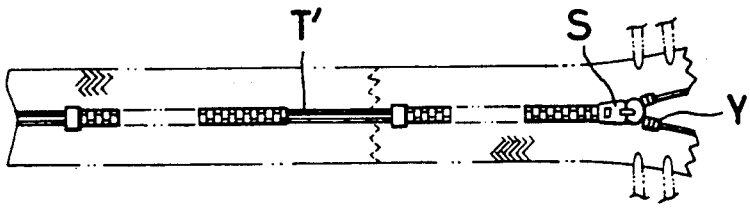
Figure 3E:
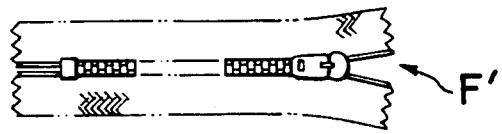

The stringer chain F thus assembled with selected ones of sliders S and selected ones of bottom end stops W' is now provided at the top end stop applying unit 14 with top end stops Y as shown in FIG. 3(d), the top end stop Y being attached to the inner edge of the stringer tape T immediately after the slider S is applied, in a manner well known. Since the top end stops Y are relatively small in size and is substantially concealed from view when the slider S is pulled all way up, they may all be of the same type and color. However, if desired, top end stops Y of different types or colors may be selectively applied to the fastener chain F by utilizing the above-described bottom end stop applying unit 12.

The fastener chain F now fully assembled is cut centrally across the space portion T' of the stringer tapes T, T, as shown in FIG. 3(d), into an individual slide fasteners product F'. This cutting is performed at the cutting unit 15 located downstream of the slider applying unit 13 and comprising vertically disposed coacting cutters 85 of any conventional construction.

Designated at 86 in FIG. 1 are a pair of feed grippers which are arranged to move reciprocably along the path of the stringer chain F to hold the ensuing leading portion of the stringer chain F and bring the latter into position for the next cycle of parts assembling operation in a manner well known. Designated at 87 is a withdrawal gripper which draws the finished slide fastener F' out for storage.

All of the foregoing units 11-15 are correlated in operation and controlled by computer programs as schematically shown in FIG. 2.

The invention will now be further described in connection with the method of making slide fasteners of a separable type contrastive to the non-separable slide fastener hereinabove dealt with. The separable slide fastener generally designated F" has a separator Z typically comprising a guide pin member P and a socket pin $B_p$ integral with a socket member B as shown in FIG. 11(f) which are releasably engageable with each other.

Figure 10:
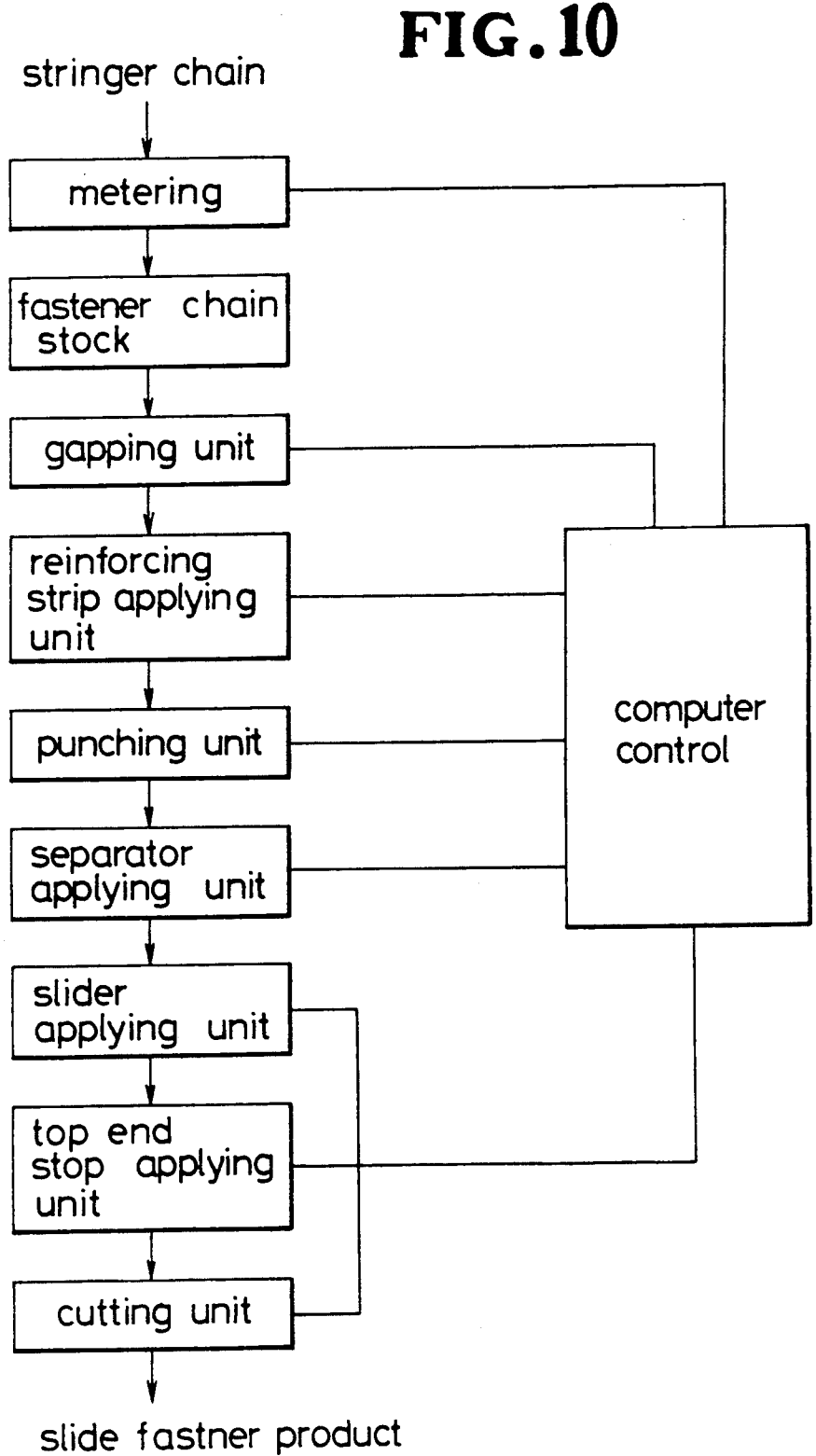
FIG. 10 is a block diagram showing the various stage of parts assembling for a separable slide fastener.

In order to provide the stringer chain F at predetermined intervals with pins P and sockets B of selected forms, color and other characteristics, the production system further incorporates a reinforcing strip applying unit 18, a punching unit 15' and a separator applying unit 101 which are interposed between the gapping unit 11 and the slider applying unit 13 as shown in FIG. 10, wherein the bottom end stop applying unit 12 is excluded as the bottom end stop W' is replaced by the separator Z which likewise functions as a bottom end stop.

The stringer chain F is now provided with a reinforcing strip R at the element-free space portion T' which has been previously formed at the gapping unit 11. The reinforcing strip applying unit 16, as better shown in FIG. 12, includes a strip stocker 88 in the form of a horizontally disposed rectangular box containing a plurality of reinforcing strips $R_1$–$R_6$ differing for instance in form, color, material or other characteristics which are supported in parallel spaced relation to one another.

Figure 12:
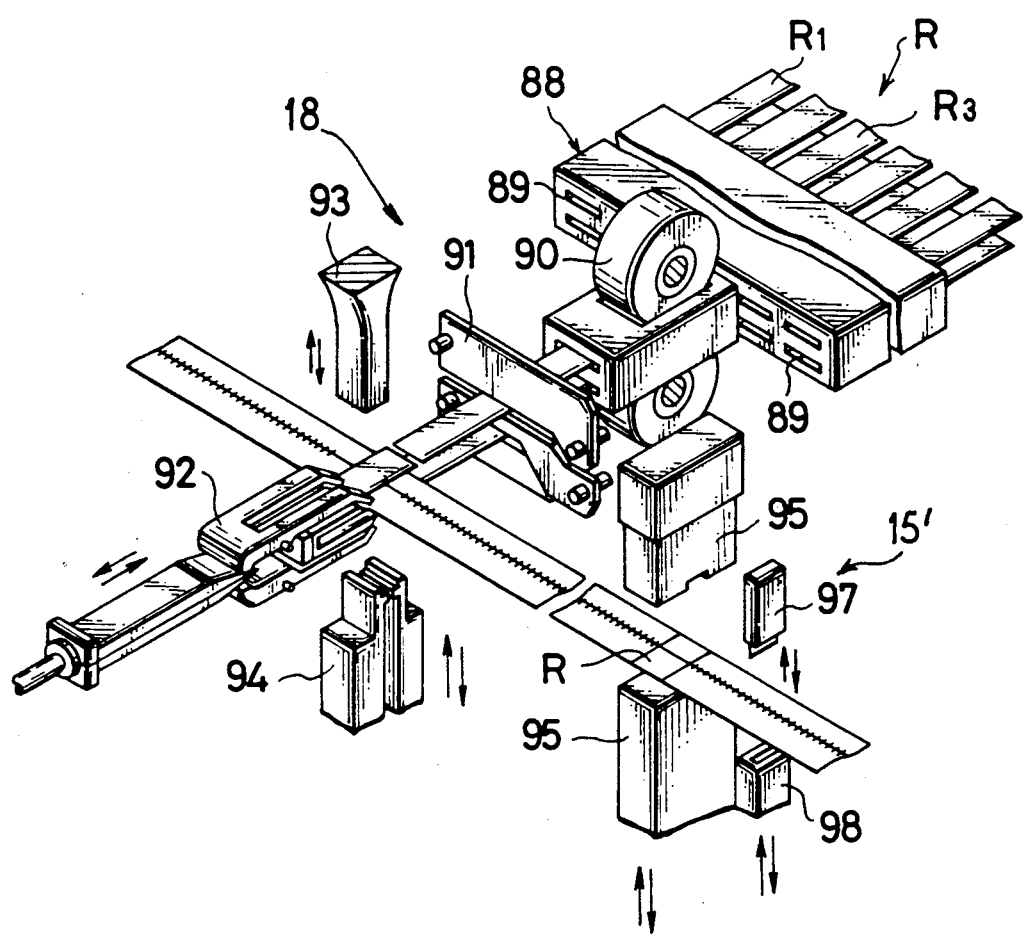
FIG. 12 is a schematic perspective view of an apparatus for applying a reinforcing strip to the stringer chain.
Figure 13A:
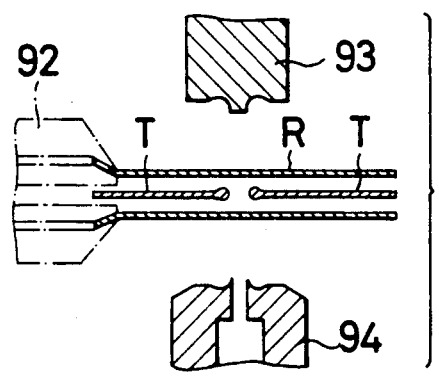
FIGS. 13(a)-13(d) are schematic views utilized to explain the manner of attaching the reinforcing strips to the stringer chain.
Figure 13B:
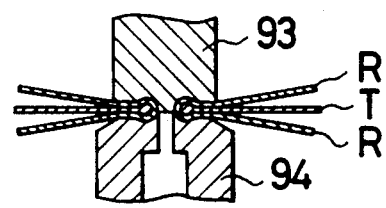
Figure 13C:
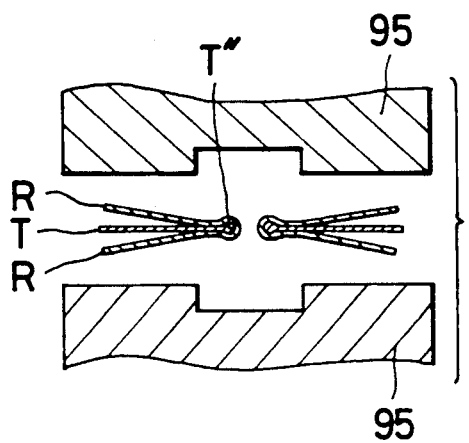
Figure 13D:
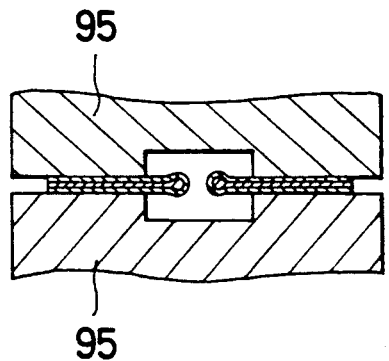

For purposes of illustration, the reinforcing strips R are formed from an elongate plastics material. The strip stocker 88 has a plurality of slits 89 arranged in two rows and directed toward the path of the stringer chain F for feeding therethrough a pair of like reinforcing strips R in superimposed relation. The strip stocker 88 is movable reciprocably by means not shown along a horizontal path parallel with the path of the stringer chain F. The unit 16 further includes a pair of feed rollers 90 for feeding a selected pair of like reinforcing strips R from among the slits 89 in the strip stocker 88 upon arrival thereof at a position instructed as per preset computer program at which the feed rollers 90 register for instance with a pair of slits 89 associated with the corresponding pair of reinforcing strips $R_3$ as shown in FIG. 12. The reinforcing strips $R_3$ are withdrawn a predetermined length from the stocker 88 and thereafter cut by cutters 91. The thus cut pair of strips $R_3$ are gripped by a gripper 92 which is movable reciprocally transversely across the stringer chain F and are brought one above and the other below the chain F at the space portion T'.

The two reinforcing strips $R_3$ thus superposed across the space portion T' of the stringer chain F are attached thereto by fusion with use of a supersonic or high frequency energy applying horn 93 and an anvil 94 both movable vertically toward and away from each other in the path of the stringer chain F as shown in FIG. 12, whereupon the material of the strips $R_3$ melts and forms a beaded edge T" at the space portion T'. The strips $R_3$ are then bonded to the respective stringer tapes T, T with heat and pressure by means of a pair of heaters 95 as shown in FIG. 12.

Figure 11A:
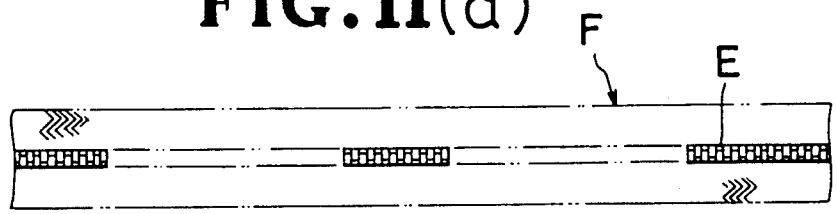
FIG. 11(a)-11(f) are plan views of a stringer chain shown progressively assembled and finished.
Figure 11B:
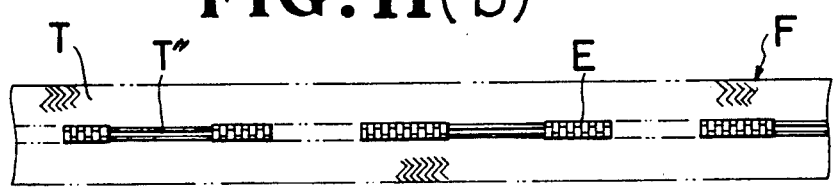
Figure 11C:
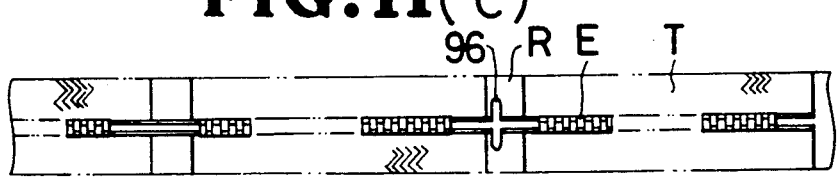

The stringer chain F is then provided at its reinforced portion with a transverse aperture 96 by means of a punch 97 and a die 98 both movable toward and away from each other in the path of the stringer chain F at the punching unit 15' shown in FIG. 11(c).

Figure 11D:
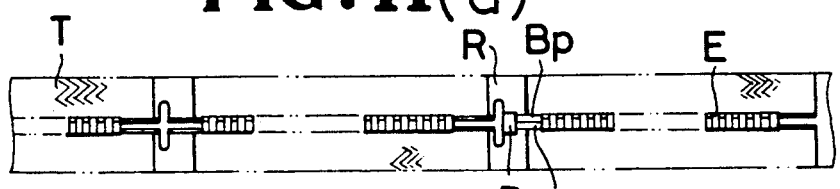
Figure 14:
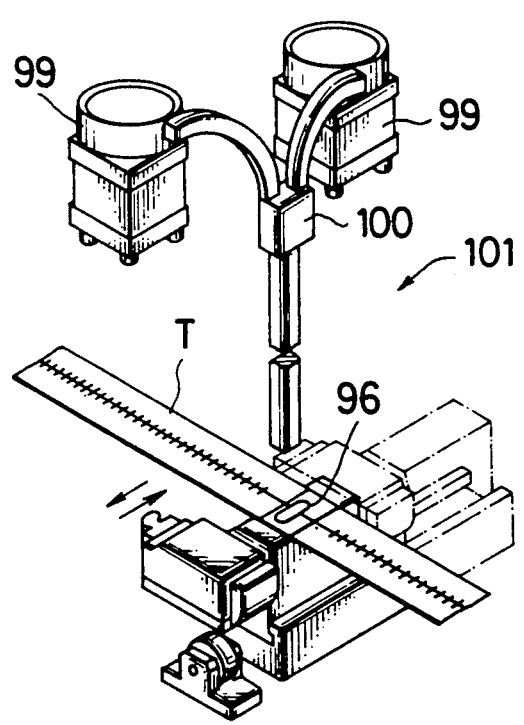
FIG. 14 is a schematic perspective view of an apparatus for applying a pin member of a separator to the stringer chain.
Figure 15:
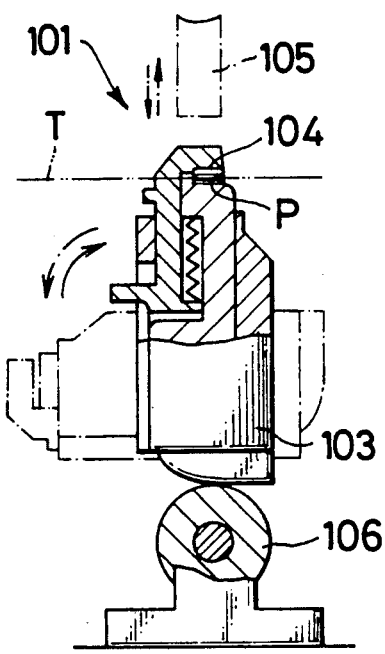
FIG. 15 is a partly sectional elevational view utilized to explain the manner of applying the pin member.
Figure 16:
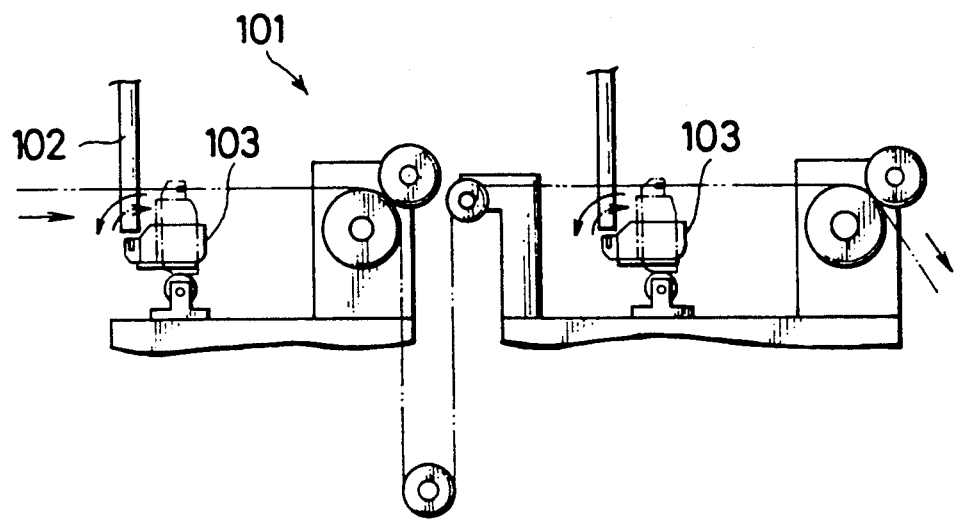
FIG. 16 is a schematic view utilized to explain the manner of applying a socket member of the separator in relation to the pin member.

The stringer chain F is now attached with a guide pin member P and a socket member B having a socket pin $B_p$ at the separator applying unit 101 shown in FIGS. 14, 15 and 16 inclusive. There are provided a plurality of parts feeders 99 which contain guide pins P of for instance different colors tailored to selected characteristics of the stringer chain F. The guide pins P from the respective parts feeders 99 are collectively received at a feed converter 100 which is computer-controlled to feed guide pins P of a particular color to a separator applying means 101 through a vertically disposed chute 102. The separator applying means 101 includes a guide pin holder 103 having a pocket 104 for receiving the guide pin P from the chute 102 and transferring the same onto the stringer chain F. The guide pin holder 103 is rotatable between a horizontal position (indicated by phantom line in FIG. 15) in which the holder 103 receives the guide pin P at its pocket 104 and a vertical position in which the holder 103 transfers the guide pin P onto the stringer chain F. More specifically, as the holder 103 rotates into the vertical position, the pocket 104 is held in alignment with the path of the stringer chain F so that the guide pin P is inserted through the aperture 96 and thrusted through one of the beaded inner edges T" of the stringer tapes T, T which have been reinforced with the reinforcing strip R at the space portion T'. The guide pin P is then clamped in place on the stringer chain F by means of a punch 105 cooperating with a cam roller 106 as shown in FIG. 15 and FIG. 11(d). The stringer chain F having the guide pin P attached to the one inner beaded edge T" of the stringer tapes T, T is thereafter attached with a selected socket pin $B_p$ with socket B fed from parts feeder (not shown) similar to the guide pin parts feeders 98, the operation of attaching the socket pin $B_p$ being substantially the same as attaching the guide pin P already described, except that the socket pin $B_p$ is clamped to the other beaded inner edge T" confronting the guide pin P.

Figure 11E:
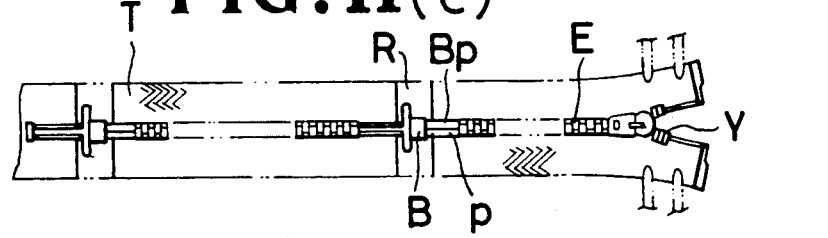
Figure 11F:
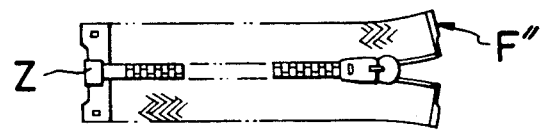

The stringer chain F is thereafter advanced to the slider applying unit 13, the top end stop applying unit 14 and the cutting unit 15 respectively and finished to provide a separable type of slide fastener F" as shown in FIGS. 11(e) and 11(f) which has component parts of harmonious characteristics.

Obviously, various modifications and variations of the present invention are possible in the light of the above teaching. It is therefore to be understood that within the scope of the appended claims the invention may be practiced otherwise than as specifically described.

What is claimed is:

1. A method of manufacturing slide fasteners in combination with the steps of gapping an elongate continuous stringer chain to provide element-free space portions at predetermined intervals therealong, applying various fastener component parts to said stringer chain and cutting said stringer chain into individual slide fastener products, said method comprises metering said elongate continuous stringer chain to provide different prospective slide fastener product lengths and maintaining a provisional inventory of the thus metered lengths of the stringer chain in advance of said gapping.

2. A method according to claim 1 wherein said stringer chain is one and the same type.

3. A method according to claim 1 wherein said stringer chain consists of a plurality of different types of interconnected groups of stringers.

4. A method according to claim 3, wherein said different types of interconnected stringers carry on them differently fashioned or colored component parts, and the method comprises the further step of synchronizing the selection of component parts to be applied to said stringers with the product lengths stored in said provisional inventory.

5. A method according to claim 1, wherein said provisional inventory is held in a relaxed state of tension.

6. An apparatus for manufacturing slide fasteners, wherein a gapping means is utilized for gapping an elongate continuous stringer chain to provide element-free space portions at predetermined intervals therealong, applying means are utilized for applying fastener component parts to the stringer chain, and a cutting means is utilized for cutting said stringer chain into individual slide fastener products, comprising a metering means for metering said stringer chain to provide different prospective slide fastener product lengths; and a reservoir for maintaining a provisional inventory of the thus metered lengths of the stringer chain, both of said metering means and said reservoir being located upstream of the position of said gapping means.

7. An apparatus according to claim 6, wherein said reservoir is adapted to hold said stringer chain in a manner where said stringer chain is overlapped onto itself a plurality of times.

8. An apparatus according to claim 7, wherein said reservoir is adapted to hold said stringer chain in a fan-folded fashion.

9. An apparatus according to claim 6 further comprising a controller; and
said metered lengths of said stringer chain comprise at least two types of stringers each for carrying different component parts thereon; and
said controller communicates with said metering means and said applying means to synchronize the applying of component parts to respective stringers according to said metered lengths.

10. An apparatus according to claim 6, wherein said reservoir is fashioned to hold said stringer chain accumulated therein in a relaxed state of tension.

* * * * *